United States Patent [19]
Yamada

[11] Patent Number: 5,459,526
[45] Date of Patent: Oct. 17, 1995

[54] PROGRAMMABLE SYNC REPRODUCING CIRCUIT CAPABLE OF PROCESSING MULTI-SYNC SIGNALS

[75] Inventor: Masahiro Yamada, Kawasaki, Japan

[73] Assignee: Kabushiki Kaisha Toshiba, Kawasaki, Japan

[21] Appl. No.: 384,470

[22] Filed: Feb. 3, 1995

Related U.S. Application Data

[63] Continuation of Ser. No. 77,534, Jun. 16, 1993, abandoned.

[30] Foreign Application Priority Data

Jun. 16, 1992 [JP] Japan ..................... 4-156990

[51] Int. Cl.$^6$ ............... H04N 5/46; H04N 5/52; H04N 5/16
[52] U.S. Cl. ............ 348/555; 348/558; 348/678; 348/691; 348/528
[58] Field of Search ................. 348/555, 558, 348/528, 691, 678, 685; H04N 5/46, 5/52, 5/16

[56] References Cited

U.S. PATENT DOCUMENTS

| | | | |
|---|---|---|---|
| 4,872,054 | 10/1989 | Gray et al. | 358/140 |
| 5,132,793 | 7/1992 | Hirahata et al. | 358/140 |
| 5,264,931 | 11/1993 | Yamada | 348/720 |
| 5,285,264 | 2/1994 | Matsushita | 348/571 |

FOREIGN PATENT DOCUMENTS

| | | |
|---|---|---|
| 4256294 | 9/1992 | Japan . |
| 2212692 | 7/1989 | United Kingdom ........... H04N 5/18 |
| 2249236 | 4/1992 | United Kingdom ........... H04N 5/18 |

OTHER PUBLICATIONS

Patent Abstracts of Japan, vol. 14, No. 553 (E-1010) 7 Dec. 1990 & JP-A-02 237 280 (Hitachi) 19 Sep. 1990 * abstract *.

Patentm Abstracts of Japan, vol. 12, No. 402 (E-673) 25 Oct. 1988 & JP-A-63 141 470 (Matsushita Electric) 13 Jun. 1988 * abstract *.

Ulrich Schmidt et al.: "Data-Driven Array Processor for Video Signal Processsing"; IEEE 1990 International Conference on Consumer Electronics—FPM-21.3, pp. 326-327.

Primary Examiner—James J. Groody
Assistant Examiner—Cheryl Cohen
Attorney, Agent, or Firm—Cushman Darby & Cushman

[57] ABSTRACT

An image signal processing apparatus wherein image signals of plural kinds transmitted in different TV systems can selectively be reproduced, to provide an image signal processing apparatus wherein image signals of plural kinds transmitted in different systems can selectively be reproduced with simple construction, high cost-effectiveness, and high practicability. The apparatus has a sync signal generating unit for performing arithmetic operation processing for extracting a sync signal component from an input image signal, by changing a processing program in accordance with a transmission system of the input image signal, and a decoding unit for decoding the input image signal on the basis of a sync signal generated by the sync signal generating unit.

13 Claims, 5 Drawing Sheets

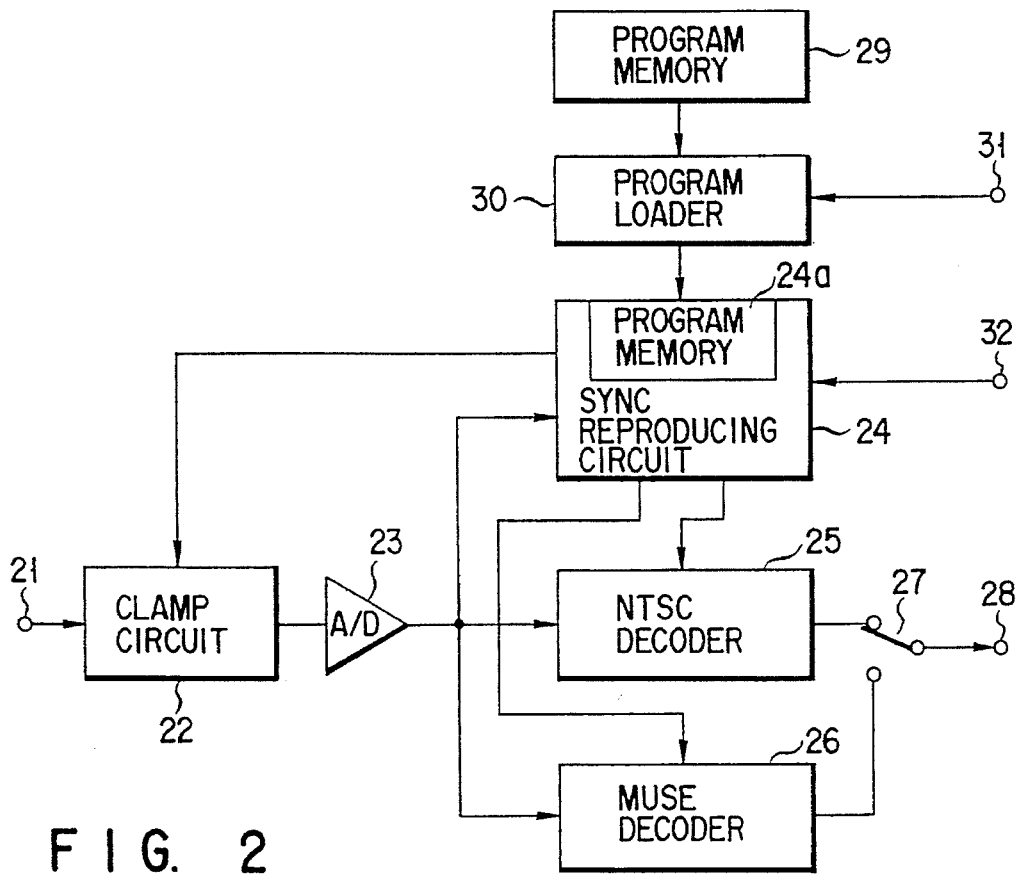
F I G. 2

PROGRAMMABLE SYNC REPRODUCING CIRCUIT CAPABLE OF PROCESSING MULTI-SYNC SIGNALS

This is a continuation of application Ser. No. No. 08/077,534, filed on Jun. 16, 1993.

BACKGROUND OF THE INVENTION

1. Field of the Invention

The present invention relates to an image signal processing apparatus for selectively reproducing and processing plural kinds of image signals transmitted in different television systems, and more particularly to an image signal processing apparatus wherein a sync signal component is obtained from each input image signal by sync reproducing means using a DSP (Digital Signal Processor).

2. Description of the Related Art

As is well known, the broadcasting media have recently been diversified in accordance with developments in digital technology. In particular, in addition to TV broadcasting of NTSC system using VHF band and UHF bands of ground waves, there have been realized, for example, TV broadcasting of NTSC system using a BS (Broadcasting Satellite) and TV broadcasting of high image quality (high vision) of MUSE system.

FIG. 1 shows a conventional TV receiver developed to meet requirements of diversified broadcasting media. The TV receiver has a function of selectively reproducing signals of NTSC TV broadcasting and MUSE TV broadcasting. In FIG. 1, numeral 11 denotes an input terminal. The input terminal 11 is supplied selectively with image signals of analog base bands transmitted in the NTSC or MUSE systems.

The image signal supplied to the input terminal 11 is delivered to a clamp circuit 12, and the level of the image signal is adjusted. Then, the output from the clamp circuit 12 is fed to an A/D (analog/digital) conversion circuit 13 and converted to digital image data. The digital image data output from the A/D conversion circuit 13 is supplied to an NTSC sync reproducing circuit 14, an NTSC decoder 15, a MUSE sync reproducing circuit 16 and a MUSE decoder 17.

When the image signal supplied to the input terminal 11 is an NTSC image signal, the NTSC sync reproducing circuit 14 is driven. On the basis of the input digital image data, the NTSC sync reproducing circuit 14 generates a clock, a horizontal sync signal, etc. corresponding to the NTSC system and outputs them to the NTSC decoder 15. The NTSC decoder 15 subjects the input digital image data to decoding processing on the basis of the clock, horizontal sync signal, etc. generated by the NTSC sync reproducing circuit 14. Thus, the NTSC image signal is reproduced.

When the image signal supplied to the input terminal 11 is a MUSE image signal, the MUSE sync reproducing circuit 16 is driven. On the basis of the input digital image data, the MUSE sync reproducing circuit 16 generates a clock, a horizontal sync signal, etc. corresponding to the MUSE system and outputs them to the MUSE decoder 17. The MUSE decoder 17 subjects the input digital image data to decoding processing on the basis of the clock, horizontal sync signal, etc. generated by the MUSE sync reproducing circuit 16. Thus, the MUSE image signal is reproduced.

The digital image data output from the NTSC decoder 15 or MUSE decoder 17 is selected by a switch 18 and taken out from an output terminal 19. When the image signal supplied to the input terminal 11 is an NTSC image signal, the switch 18 is operated to pass the output of the NTSC decoder 15 to the output terminal 19. On the other hand, when the image signal supplied to the input terminal 11 is a MUSE image signal, the switch 18 is operated to pass the output of the MUSE decoder 17 to the output terminal 19. Thereby, NTSC TV broadcasting or MUSE TV broadcasting are selectively reproduced.

The NTSC sync reproducing circuit 14 outputs a control signal for controlling the level adjustment in the clamp circuit 12 for an NTSC image signal, and the MUSE sync reproducing circuit 16 outputs a control signal for controlling the level adjustment in the clamp circuit 12 for a MUSE image signal. The control signal from the circuit 14 or 16 is selected by a switch 20 and supplied to the clamp circuit 12.

When the image signal supplied to the input terminal 11 is the NTSC image signal, an switch 20 is operated to pass the control signal from the NTSC sync reproducing circuit 14 to the clamp circuit 12. On the other hand, when a image signal supplied to the input terminal 11 is the MUSE image signal, the switch 20 is operated to pass the control signal from the MUSE sync reproducing circuit 16 to the clamp circuit 12.

In the above conventional TV receiver, the NTSC sync reproducing circuit 14 and NTSC decoder 15 are provided to reproduce an NTSC image signal, and the MUSE sync reproducing circuit 16 and MUSE decoder 17 are provided to reproduce a MUSE image signal. In other words, reproducing circuits are provided individually for reproducing signals transmitted by different broadcasting media. As a result, the size and cost of the apparatus increase considerably, and the practicability of the apparatus is low.

SUMMARY OF THE INVENTION

The present invention has been made in consideration of the above circumstances, and its object is to provide an image signal processing apparatus wherein image signals of plural kinds transmitted in different systems can selectively be reproduced with simple construction, high cost-effectiveness, and high practicability.

According to one aspect of the present invention, there is provided an image signal processing apparatus to which image signals of plural kinds transmitted in different TV systems are selectively input, comprising:

a sync signal generating unit for performing arithmetic operation processing for extracting a sync signal component from an input image signal, by changing a processing program in accordance with a transmission system of the input image signal; and a decoding unit for decoding the input image signal on the basis of a sync signal generated by the sync signal generating unit.

According to this structure, the processing program is switched in the sync signal generating unit, thereby extracting sync signal components of image signals of different systems. Since the same sync signal generating unit can be used both for reproducing image signals of different systems, image signals of plural kinds transmitted in different systems can selectively be reproduced with simple construction, high cost-effectiveness, and high practicability.

BRIEF DESCRIPTION OF THE DRAWINGS

FIG. 2 is a block diagram showing an embodiment of an image signal processing apparatus according to the present invention;

DETAILED DESCRIPTION OF THE PREFERRED EMBODIMENT

Figure 1:
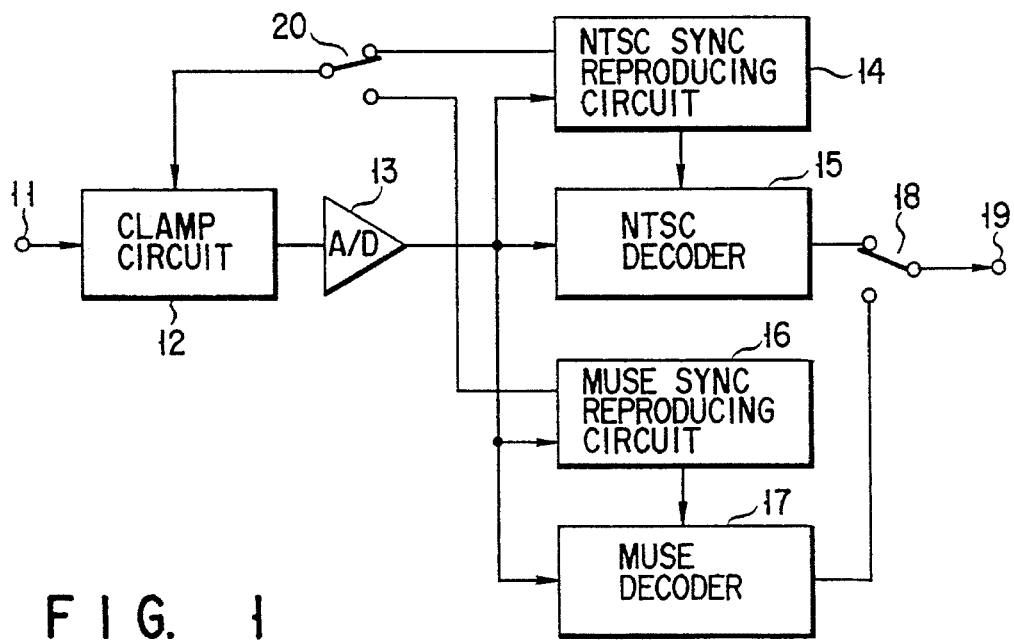
FIG. 1 is a block diagram showing a conventional TV receiver developed to meet requirements of diversified broadcasting media.

An embodiment of the present invention will now be described in detail with reference to the accompanying drawings. In FIG. 2, numeral 21 denotes an input terminal. The input terminal 21 is supplied selectively with image signals of analog base bands transmitted in either the NTSC or MUSE systems. The image signal supplied to the input terminal 21 is level-adjusted by a clamp circuit 22, and converted to digital image data by an A/D conversion circuit 23. The digital image data output from the A/D conversion circuit 23 is supplied to a sync reproducing circuit 24, an NTSC decoder 25, and a MUSE decoder 26.

When the image signal supplied to the input terminal 21 is an NTSC image signal, the sync reproducing circuit 24 generates a clock, a horizontal sync signal, etc. corresponding to the NTSC system, on the basis of the input digital image data, and outputs them to the NTSC decoder 25. The NTSC decoder 25 subjects the input digital image data to decoding processing on the basis of the clock, horizontal sync signal, etc. which correspond to the NTSC system and which are generated by the sync reproducing circuit 24. Thus, the NTSC image signal is reproduced.

When the image signal supplied to the input terminal 21 is a MUSE image signal, the sync reproducing circuit 24 generates a clock, a horizontal sync signal, etc. corresponding to the MUSE system, on the basis of the input digital image data, and outputs them to the MUSE decoder 26. The MUSE decoder 26 subjects the input digital image data to decoding processing on the basis of the clock, horizontal sync signal, etc. which correspond to the MUSE system and which are generated by the sync reproducing circuit 24. Thus, the MUSE image signal is reproduced.

The digital image data output from the NTSC decoder 25 or MUSE decoder 26 is selected by a switch 27 and taken out from an output terminal 28. When the image signal supplied to the input terminal 21 is an NTSC image signal, the switch 27 is operated to pass the output of the NTSC decoder 25 to the output terminal 28. On the other hand, when the image signal supplied to the input terminal 21 is a MUSE image signal, the switch 27 is operated to pass the output of the MUSE decoder 26 to the output terminal 28. Thereby, NTSC TV broadcasting or MUSE TV broadcasting are selectively reproduced.

The sync reproducing circuit 24 outputs control signals for controlling the level adjustment in the clamp circuit 22 for the NTSC and MUSE image signals. The control signals from the circuit 24 are supplied to the clamp circuit 22.

The sync reproducing circuit 24 is constructed by making use of a DSP architecture. Specifically, a program 10 is loaded in the sync reproducing circuit 24 from the outside, and thereby a clock, a horizontal sync signal, etc. are generated on the basis of the input digital image data. In this case, the function of the sync reproducing circuit 24 is switched by changing the program to be loaded, so that the circuit 24 performs the processing for generating the clock, horizontal sync signal, etc. corresponding to an NTSC system or the processing for generating the clock, horizontal sync signal, etc. corresponding to a MUSE system.

The programs to be loaded in the sync reproducing circuit 24 are stored in a program memory 29. The programs stored in the memory 29 are read out via a program loader 30 and transferred to a program memory 24a in the sync reproducing circuit 24. The program loader 30 is supplied, via an input terminal 31, with a channel selection signal generated by a user's channel selection operation, a TV system determination signal, or the like.

On the basis of a signal input from the input terminal 31, the program loader 30 determines whether it should read out, from the program memory 29, a program for enabling the sync reproducing circuit 24 to generate a clock, a horizontal sync signal, etc. corresponding to the NTSC system and should transfer that read-out program to the circuit 24, or it should read out, from the memory 29, a program for enabling the sync reproducing circuit 24 to generate a clock, a horizontal sync signal, etc. corresponding to the MUSE system and should transfer that program to the circuit 24.

In order to enable the sync reproducing circuit 24 to generate the clock, horizontal sync signal, etc. corresponding to each kind of TV system, a plurality of programs for generating the clock, horizontal sync signal, etc. corresponding to each kind of TV system may be stored in advance in the program memory 24a within the sync reproducing circuit 24. In this case, in the sync reproducing circuit 24, a necessary program is selectively read out from the program memory 24a on the basis of the channel selection signal, TV system determination signal, etc. supplied via the input terminal 32, thereby performing a process for generating the clock, horizontal sync signal, etc.

Figure 3:
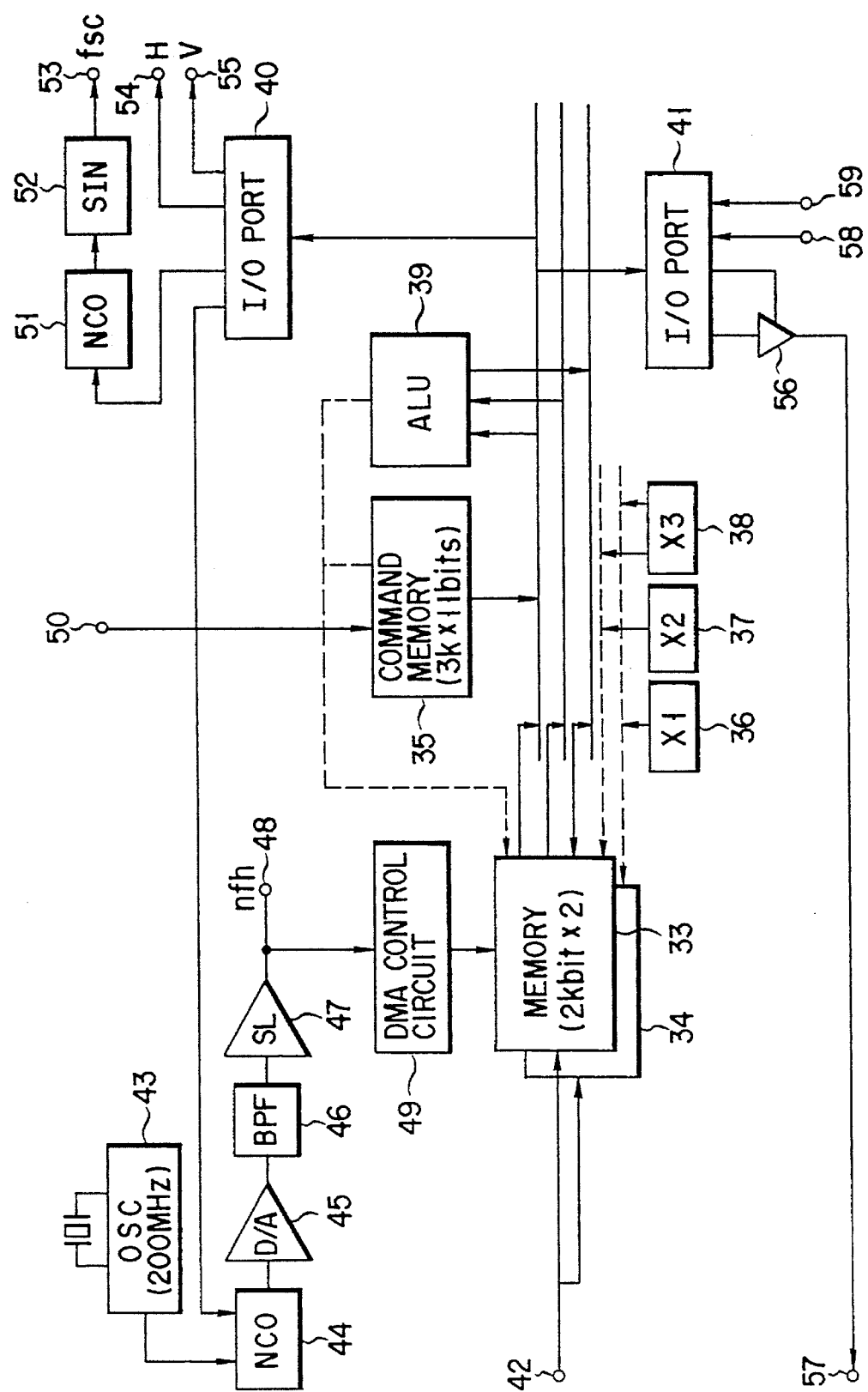
FIG. 3 is a block diagram for describing in detail a sync reproducing circuit in the embodiment.

FIG. 3 shows a detailed structure of the sync reproducing circuit 24. This circuit 24 is constituted by making use of DSP architecture which basically comprises a memory 33, a memory 34, a command memory 35, registers 36, 37 and 38, an ALU (Arithmetic Logic Unit) 39, I/O (Input/Output) ports 40 and 41, and peripheral circuits suitable for synchronization processing. Specifically, composite digital image data supplied to an input terminal 42 is supplied to one of the memories 33 and 34.

On the other hand, an NCO (an oscillator whose oscillation frequency is digitally variable) 44, which is supplied with an oscillation signal of a fixed frequency from an oscillation circuit 43, outputs an oscillation signal of an oscillation frequency on the basis of output data from the I/O port 40. The oscillation signal output from the NCO 44 is supplied to a D/A (Digital/Analog) conversion circuit 45, and the resultant analog signal is supplied to a BPF (Band-Pass Filter) 46 so that a high-frequency component is removed from the analog signal. The output from the BPF 46 is delivered to a slicer 47 and converted to a two-value signal.

The signal obtained by the slicer 47 is supplied via an output terminal 48 to the NTSC decoder 25 and MUSE decoder 26 as a clock nfh having a frequency obtained by multiplying a horizontal frequency fh by n. The value n is 910 in the case of NTSC, since a color sub-carrier frequency multiplied by four is equal to 910 fh.

The clock nfh is also supplied to a DMA (Direct Memory Access) control circuit 49 to control the operation of taking the composite digital image data supplied from the input terminal 42 into the memory 33 or 34. Specifically, the DMA control circuit 49 divides the clock nfh internally (e.g. 910 division in the case of n=910), and controls the operation of taking the composite digital image data into the input terminal 42 to the memory 33 or 34 at a predetermined horizontal timing of the division output. If the phase of the division signal is synchronized with the composite digital image data, the composite digital image data at a fixed position is constantly fed to the memory 33 or 34.

A program output from the program loader 30 is stored in the command memory 35 (corresponding to the program memory 24a in FIG. 2) via an input terminal 50. Then, data decoded in accordance with the stored program is output from the command memory 35, and the memories 33 and 34, ALU 39, I/O ports 40 and 41 and registers 36, 37 and 38 are controlled by the output data. Thus, signal processing is performed according to the program.

An output from the I/O port 40 is supplied via an NCO 51 to a SIN conversion circuit 52, thereby generating a color sub-carrier fsc used for color signal demodulation. The color sub-carrier fsc is output via an output terminal 53 to the NTSC decoder 25 and MUSE decoder 26. In this case, the color sub-carrier fsc is controlled by the NCO 51 to synchronize with a color burst signal included in the input composite digital image data.

In addition, a horizontal sync signal H and a vertical sync signal V are output from the I/O port 40. The horizontal sync signal H and vertical sync signal V are output via output terminals 54 and 55 respectively to the NTSC decoder 25 and MUSE decoder 26.

On the other hand, a control signal for controlling the level adjustment of the clamp circuit 22 is output from the I/O port 41 via an output circuit 56. This control signal is output in the form of a PWM (Pulse Width Modulation) signal and supplied via an output terminal 57 to the clamp circuit 22. In addition, the I/O port 41 receives from the outside via input terminals 58 and 59 a color matrix coefficient, a user's channel selection signal, a system determination signal, etc.

Figure 4:
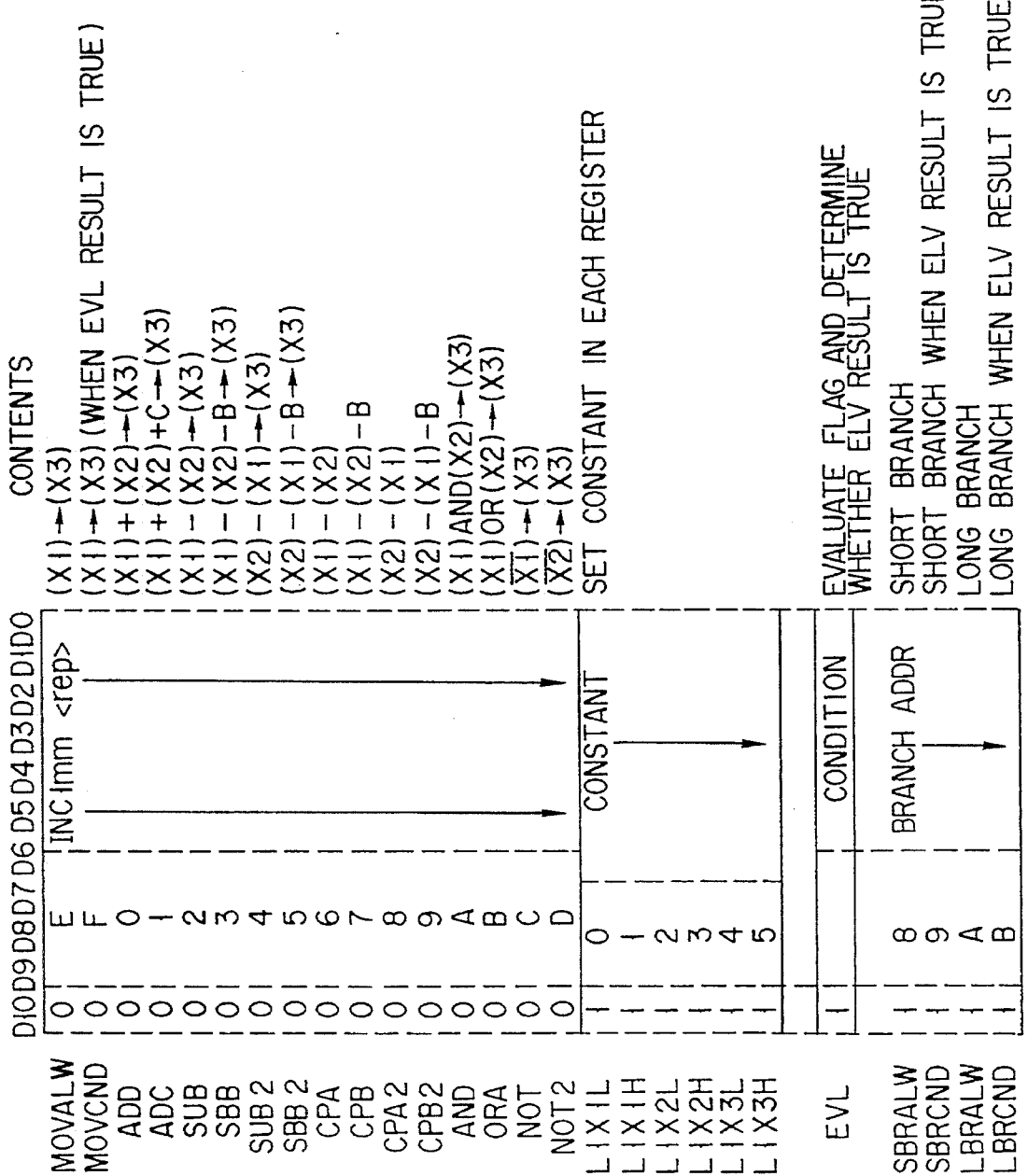
FIG. 4 is a view for describing the list of commands delivered to the sync reproducing circuit in the embodiment.

FIG. 4 is a list of commands delivered to the sync reproducing circuit 24. For example, there are commands relating to data transfer between the memory 33, 34 and command memory 35, execution of computations in the ALU 39, setting of constants in the registers 36, 37 and 38, a change of program flow.

In FIG. 4:

I mm=0: first and second operands (X1) and (X2) are used.

I mm=1: a constant value designated by <rep> field is used as first operand.

INC: when INC=1, registers 36, 37 and 38 for X1, X2 and X3 are increased by +1.

<rep>: the number of times of repetition is designated. At the time of "0", the number of times is regarded as 16.

CONDITION: C=0, C=1, Z=0, Z=1, (X1)=0, (x1)=1, (x2)=0, (x2)=1, (x3)=0, (x3)=1.

SHORT BRANCH: address ADDR is set in a lower bit of a program counter.

LONG BRANCH: address ADDR is set in an upper bit of a program counter.

Figure 5:
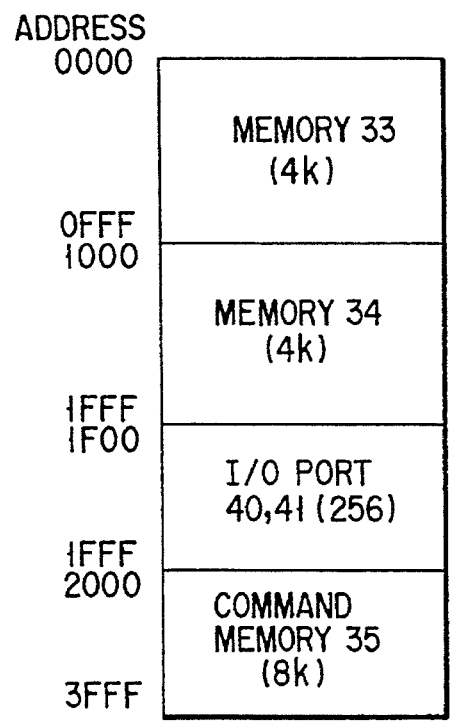
FIG. 5 is a view for illustrating a memory map of the sync reproducing circuit in the embodiment.

FIG. 5 shows a memory map of all of the memories 33 and 34 and command memory 35. In a single address space, each of the memory 33, memory 34, I/O ports 40 and 41, and command memory 35 is mapped. By choosing the address value, desired data can be transferred.

Figure 6:
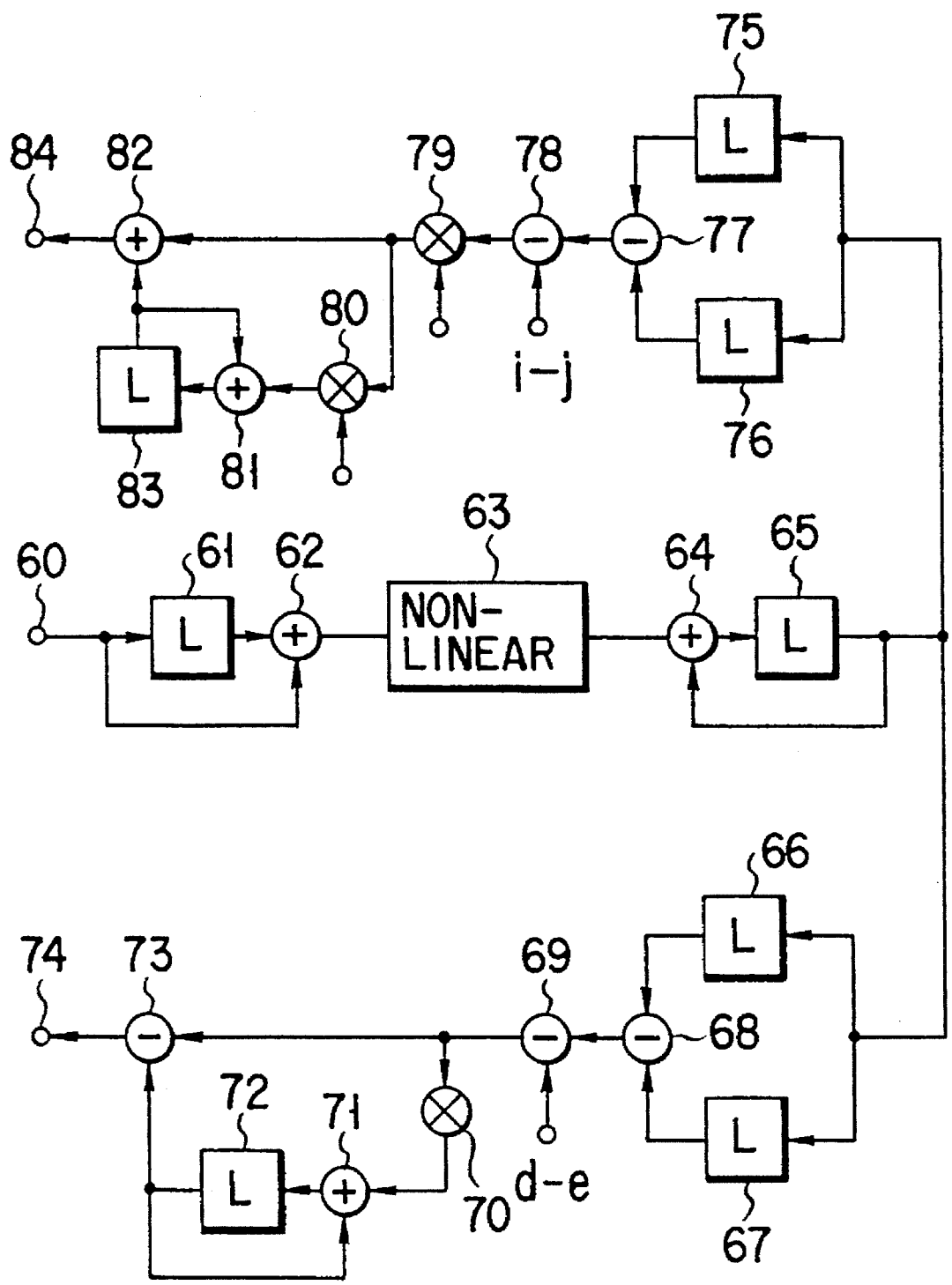
FIG. 6 is a block diagram illustrating the functional aspects of the sync reproducing circuit of the embodiment on the basis of the flow of signals.

FIG. 6 illustrates the functional aspects of the sync reproducing circuit 24 shown in FIG. 3 on the basis of the flow of signals. In FIG. 6, numeral 60 denotes an input terminal which is supplied with composite digital image data read out from the memory 33, 34. The data supplied to the input terminal 60 is delayed by one pixel by a latch circuit 61. The input data and output data of the latch circuit 61 are added by an addition circuit 62 and subjected to LPF (Low-Pass Filter) processing.

Figure 7:
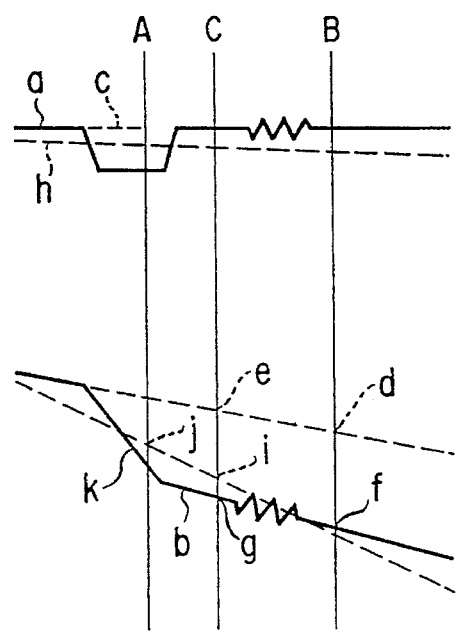
FIG. 7 is a view for describing the function of the sync reproducing circuit in the embodiment.

The data stored in the memory 33, 34 is composite data of a sync component and an image component. In this case, the sync component is more important. Thus, the output data of the addition circuit 62 is passed through a non-linear circuit 63 and the image component is compressed. The output data from the non-linear circuit 63 is subjected to integration processing by use of an addition circuit 64 and a latch circuit 65. The waveform of the integrated data is shown in FIG. 7. In FIG. 7, indicates a data waveform prior to integration, and indicates a data waveform after integration.

In order to control the clamp circuit 22, it is necessary to detect how much the input data deviates from reference data, from the viewpoint of DC. In FIG. 7, indicates data obtained by integrating reference data. Considering an integration time period C-B, if the difference between integration values d and e of reference data is equal to the difference between integration values f and g of input data, the DC level of A/D conversion output is correct.

The output data of the latch circuit 65 is latched at the timing of C of FIG. 7 by latch circuit 66 and latched at the timing of B of FIG. 7 by latch circuit 67. The outputs of latch circuits 66 and 67 are supplied to a subtraction circuit 68. Thus, a difference f-g of integration values is obtained. A difference d-e of integration values of reference data is memorized in advance in a program as a constant, and a difference f-g is obtained by a subtraction circuit 69. The thus obtained error data is filtered through a multiplying circuit 70, an addition circuit 71, a latch circuit 72 and a subtraction circuit 73. The filtered data is derived from an output terminal 74.

On the other hand, in order to effect horizontal synchronization, the clock nfh obtained at the output terminal 48 (see FIG. 3) is controlled so that the difference in integration value between the slice level h and input data becomes zero in a time period A-C in FIG. 7. That is, there is no problem if the difference i-j in integration value of reference data is equal to the difference g-k in integration value of input data.

Accordingly, the output of the latch circuit 65 is latched at the timing of A of FIG. 7 by latch circuit 75 and latched at the timing of C of FIG. 7 by latch circuit 76. The outputs of latch circuits 75 and 76 are supplied to a subtraction circuit 77. Thus, the difference g-k of integration value is obtained. Then, a difference i-j in integration value of reference data stored in advance in the program as a constant is subtracted by a subtraction circuit 78, thereby obtaining error data. The error data is filtered through a loop filter comprising multiplying circuits 79 and 80, addition circuits 81 and 82 and a latch circuit 83. The filtered data is output via an output terminal 84 and controlled by the NCO 44 (see FIG. 3). Thus, the NCO 44 is oscillated at frequency nfh and a sync signal portion is taken in the memory 33, 34 at a predetermined position.

In addition, MUSE signals and image signals of PAL and SECAM system, other than the NTSC, can be subjected to the sync signal processing in the same manner as in the NTSC system by modifying the contents of signal processing shown in FIG. 6.

According to the structure of the above embodiment, the program supplied to the sync reproducing circuit 24 is switched, thereby performing either the processing for generating a clock, horizontal sync signal, etc. corresponding to the NTSC system or the processing for generating a clock, horizontal sync signal, etc. corresponding to the MUSE system. Thus, the same sync reproducing circuit 24 can be used both for NTSC and MUSE processing. Image signals of plural kinds transmitted in different systems can selectively be reproduced with simple construction. The apparatus of the present invention is cost-effective and highly practicable.

The present invention is not limited to the above embodiment and various modifications may be made without departing from the spirit of the invention.

What is claimed is:

1. An image signal processing apparatus to which image signals transmitted from plural kinds of different TV systems are selectively input, comprising:

a sync reproducing circuit for generating a sync signal by performing arithmetic operation processing on an input image signal transmitted from a plurality of different kinds of TV systems, said arithmetic operation processing extracting a sync signal component from said input image signal by changing a processing program in accordance with a type of image signal selectively input from said plurality of different kinds of TV systems; and decoding means for decoding the input image signals on the basis of a sync Signal generated by said sync reproducing circuit;

clamp means for performing level adjustment of an input image signal; and conversion means for converting the image signal, whose level has been adjusted by said clamp means, to digital image data and outputting the digital image data to said sync reproducing circuit and said decoding means, wherein said sync reproducing circuit outputs a control signal for controlling the level adjustment by said clamp means, and wherein said sync reproducing circuit comprises:

a memory for storing digital image data output from said conversion means;

non-linear means for compressing an image component included in the digital image data read out from said memory;

integration means for integrating the data output from said non-linear means in a first integration time period and a second integration time period;

first arithmetic operation means for obtaining error data between the output data of said integration means in said first integration time period and data obtained by integrating preset reference data in said first integration time period;

generating means for generating a control signal for controlling the level adjustment by said clamp means, on the basis of the error data output from said first arithmetic operation means;

second arithmetic operation means for obtaining error data between the output data of said integration means in said second integration time period and data obtained by integrating said reference data in said second integration time period; and control means for controlling a timing operation for storing the digital image data output from said conversion means into said memory, on the basis of the error data output from said second arithmetic operation means.

2. An image signal processing apparatus to which image signals of plural kinds transmitted in different TV systems are selectively input, the apparatus comprising:

conversion means for converting an input image signal to digital image data;

sync signal generating means for performing arithmetic operation processing for extracting a sync signal component from the input image signal, by changing a processing program in accordance with a transmission system of the input image signal, said sync signal generating means including:

a memory for storing digital image data output from said conversion means, first integration means for integrating the digital image data read out from the memory in a first integration time period, first arithmetic operation means for obtaining error data between the output data of the first integration means in said first integration time period and data obtained by integrating preset reference data in said first integration time period, and control means for controlling an operation timing for storing the digital image data output from said conversion means into said memory, on the basis of the error data output from said first arithmetic operation means; and decoding means for decoding the digital image data output from said conversion means, on the basis of a sync signal generated by said sync signal generating means.

3. The image signal processing apparatus according to claim 2, wherein said sync signal generating means further comprises:

storage means for storing a plurality of programs set in accordance with the kind of TV system;

read-out means for reading out, from said storage means, the processing program corresponding to a transmission type of the input image signal; and sync reproducing means for extracting a sync signal component from the input image signal by performing arithmetic operation processing on the basis of the processing program read out by said read-out means.

4. The image signal processing apparatus according to claim 3, wherein said sync reproducing means includes a memory for storing the processing program read out by said read-out means, and performs the arithmetic operation processing for extracting the sync signal component from the input image signal on the basis of the processing program stored in said memory.

5. The image signal processing apparatus according to claim 3, wherein said read-out means determines the processing program to be read out from said storage means, on the basis of a channel selection operation.

6. The image signal processing apparatus according to claim 3, wherein said read-out means determines the processing program to be read out from said storage means, on the basis of a determination result of the system of the input image signal.

7. The image signal processing apparatus according to claim 2, wherein said sync signal generating means is constructed by a DSP.

8. The image signal processing apparatus according to claim 2, wherein said decoding means comprises:

a plurality of decoders, corresponding respectively to each kind of TV system, for decoding image signals on the basis of sync signals output from the sync signal generating means; and selection means for selecting the output of one of the decoders which corresponds to the transmission system of the input image signal.

9. The image signal processing apparatus according to claim 8, wherein said selection means determines the decoder whose output is to be selected, on the basis of a channel selection operation.

10. The image signal processing apparatus according to claim 8, wherein said selection means determines the decoder whose output is to be selected, on the basis of a determination result of the system of the input image signal.

11. The image signal-processing apparatus according to claim 2, further comprising:

clamp means for performing level adjustment of an input image signal; and wherein said conversion means converts the image signal, whose level has been adjusted by said clamp means, to digital image data and outputs the digital image data to said sync signal generating means and said decoding means, wherein said sync signal generating means outputs a control signal for controlling the level adjustment by said clamp means.

12. The image signal processing apparatus according to claim 2, wherein said TV system includes an NTSC system and a MUSE system.

13. The image signal processing apparatus according to claim 2, further comprising:

clamp means for performing level adjustment of an input signal input to said conversion means;

second integration means for integrating the digital image data read out from said memory in a second integration time period;

second arithmetic operation means for obtaining error data between the output data of said second integration means in said second integration time period and data obtained by integrating the reference data in said second integration time period; and generating means for generating a control signal for controlling the level adjustment by said clamp means.

* * * * *